United States Patent Office 3,303,030
Patented Feb. 7, 1967

3,303,030
REFRACTORY MOLD
Jerome A. Preston, Ballston Lake, N.Y., assignor, by mesne assignments, to The Dentists' Supply Company of New York, York, Pa., a corporation of New York
No Drawing. Filed June 20, 1963, Ser. No. 289,437
8 Claims. (Cl. 106—38.3)

The present invention relates to refractory molds in which gold, and other metals, can be cast; and more particularly to molds for casting gold which are made of a binder comprising hydrated calcium sulfate hemihydrate.

Molds of the type with which we are concerned have many applications, and are used extensively in the dental art. Where gold fillings and/or crowns are to be made, for example, the dental art has made wax impressions of the cavity in which the gold filling is to be placed, and then cast the wax impression in mold materials which utilize water mixes of calcium sulfate hemihydrate. The hemihydrate reacts with the water to form the dihydrate which sets up into a solid dental investment composition. Thereafter the wax is melted and removed from the mold, following which the mold is heated and molten gold is poured into the mold cavity to solidify. One of the difficulties with prior art processes, however, is that the gold castings that were made thereby would be retrieved from the mold in a tarnished condition following which they would have to be pickled before being used.

The present invention is based upon the discovery of an improved composition for making the molds used in casting gold. It has been discovered that if a reducing agent, such as graphite, and an arsenite are mixed with the hardenable materials used in making a refractory mold, molten gold allowed to solidify in such a mold will have a bright and shiny surface free from tarnish. The present invention includes the improved composition which consists essentially of calcium sulfate hemihydrate, a refractory, an alkali metal arsenite, and a reducing agent such as graphite. Such a material when hydrated and formed into a mold can be used to produce gold castings having a bright and shiny surface free from tarnish.

It is, therefore, an object of the invention to provide a refractory mold in which gold can be cast and which will cause the gold castings made therein to be bright and shiny and free from tarnish.

It is a further object of the invention to provide a composition from which such a mold can be produced.

Other objects and advantages will be apparent from the description which follows, which is intended only to illustrate and disclose, but in no way to limit the invention.

According to the invention, an improved composition is provided. Such composition comprises from about 15 parts [1] to about 50 parts of calcium sulfate hemihydrate, about 65 parts of a refractory, from about 0.1 part to about 5.0 parts of a high temperature reducing agent such as graphite, and from about 0.02 part to 3.0 parts of an alkali metal arsenite.

Any suitable refractory can be used in the mold composition provided its thermal expansion is not excessive. Refractories which have a low thermal expansion and which can be used are fused quartz, zirconium oxide, zirconium silicate, mullite, sillimanite, silicon carbide, titanium dioxide, and refractory aluminum oxide. Refractories having a somewhat higher thermal expansion such as silica, cristobalite, and tridimite have been found to be particularly desirable for the refractory molds. Satisfactory results may also be obtained using non-plastic refractory clays, fire clay, kaolinite, andalusite, titanium silicate and spinels. Refractory mixes made up of graded particles of different mesh, for example, a balanced composition of cristobalite particles and silica flour running from about 30 mesh [2] to —325 mesh have been found to be particularly advantageous.

It has been found that the particle size of the calcium sulfate hemihydrate that is employed is an important factor in producing good dense molds. For optimum results, substantially all of the calcium sulfate hemihydrate should be finer than 200 mesh and from about 96 percent to about 97.2 percent should be finer than 325 mesh.

The reducing agent which is used should be one which provides a reducing atmosphere at elevated temperatures above about 1000° F. Graphite is admirably suited for providing such a condition and so is the preferred material.

While any alkali metal arsenite can be used, potassium arsenite, lithium arsenite, and sodium arsenite are the most readily available and are the preferred materials.

It is a property of the arsenites mentioned above, and particularly sodium arsenite, that they thicken the aqueous plastic mix before setting of the calcium sulfate hemihydrate. Oxalic acid is not required to produce a workable mix, but can be added in an amount from about 0.01 part to about 1.0 part to thin out the aqueous mix prior to its setting.

Calcium sulfate hemihydrate of course "sets up" by the addition of water to form the dihydrate. The dihydrate has a decreasing coefficient of thermal expansion at temperatures just above 800° F. A small amount of NaCl added to the mix causes the coefficient of expansion to become substantially constant from about 800° F. to about 1200° F. This is particularly desirable, and so the preferred material will also include from about 0.1 to about 2.0 parts of NaCl.

In addition to the materials listed above other minor ingredients may be added, such as other wetting agents, anti-foaming agents, hydration accelerators, such as sodium sulfate, or potassium sulfate, or hydration retarders, such as sodium citrate.

The following example is presented solely for the purpose of further illustrating and disclosing the invention, and is in no way to be construed as a limitation thereon.

*Example 1*

A powdered mixture was prepared by mixing 34 parts of calcium sulfate hemihydrate, 50 parts of cristobalite, 15 parts of silica flour, 1 part of graphite, 0.083 part of sodium arsenite ($Na_2HAsO_3$), 0.1 part of oxalic acid, and 0.5 part of sodium chloride. The silica flour is, of course, a refractory and was added to the mix in addition to the cristobalite so that the refractory particles ranged in size from about 30 mesh to —325 mesh. The calcium sulfate hemihydrate was finer than 200 mesh and 96 percent was finer than 325 mesh.

A plastic mix was prepared by mixing 32 parts of water to 100 parts of the powder. The mix was vibrated around a wax pattern of a crown for a tooth and was allowed to stand for 30 minutes. The mold was heated to soften the wax and the wax was poured out. Thereafter the solidified mold was heated in a furnace to 850° F. and allowed to soak at this temperature for 30 minutes. Molten 14K gold was poured into the mold, and when the gold was solidified and retrieved from the mold, it was found to be bright and shiny and free from tarnish.

While it has been found that molds having acceptable strength can be made using from about 15 parts to about 50 parts of calcium sulfate hemihydrate with approximately 65 parts of a refractory, the preferred composition will include from about 25 to about 45 parts of calcium

---

[1] The terms "percent" and "parts," as used herein, refer to percent and parts by weight, unless otherwise indicated.
[2] Mesh sizes, as reported herein, refer to the U.S. Sieve series, unless otherwise indicated.

sulfate hemihydrate, and most preferably from about 30 to about 40 parts of calcium sulfate hemihydrate. In the preferred ranges of materials the graphite will be between about 0.5 to about 1.5 parts, and the arsenite will be between about 0.05 to about 0.10 part. In addition, oxalic acid will preferably be used in an amount between about 0.05 to about 0.15 part, and sodium chloride will preferably be used between about 0.25 to about 1.0 part.

It will be apparent that various changes and modifications can be made from the specific details set forth herein without departing from the spirit and scope of the invention as defined in the appended claims.

What I claim is:

1. A composition consisting essentially of about 65 parts of a refractory selected from the group consisting of fused quartz, zirconium oxide, zirconium silicate, mullite, sillimanite, silicon carbide, titanium dioxide, refractory aluminum oxide, silica, cristobalite, tridimite, and mixtures thereof, from about 15 to about 50 parts of finely ground calcium sulfate hemihydrate, substantially all of said hemihydrate being finer than 200 mesh, from about 0.1 to about 5.0 parts of a high temperature reducing agent which provides a reducing atmosphere at temperatures above about 1000° Fahrenheit, and from about 0.02 to about 3.0 parts of an alkali metal arsenite.

2. The composition of claim 1 which also contains from about 0.01 part to about 1.0 part of oxalic acid.

3. The composition of claim 1 which also contains from about 0.1 to about 2.0 parts of sodium chloride.

4. A composition consisting essentially of about 65 parts of a refractory selected from the group consisting of fused quartz, zirconium oxide, zirconium silicate, mullite, sillimanite, silicon carbide, titanium dioxide, refractory aluminum oxide, silica, cristobalite, tridimite, and mixtures thereof, from about 30 to about 40 parts of finely ground calcium sulfate hemihydrate, susbtantially all of said hemihydrate being finer than 200 mesh, from about 0.5 to about 1.5 parts of a graphite, and from about 0.05 part to about 0.10 part of an alkali metal arsenite.

5. The composition of claim 4 wherein the alkali metal arsenite is sodium arsenite.

6. A mold for confining molten gold comprising: a refractory surface having an effective amount of a graphite, and an alkali metal arsenite dispersed throughout its molten metal confining surface to prevent tarnish of the gold cast therein.

7. A composition consisting essentially of:
- about 34 parts of calcium sulfate hemihydrate,
- about 50 parts of cristobalite,
- about 15 parts of silica flour,
- about 1.10 parts of graphite,
- about 0.083 part of sodium arsenite, and
- about 0.5 part of sodium chloride.

8. The composition of claim 1 wherein the refractory is selected from the group consisting of silica, cristobalite, tridimite, and mixtures thereof.

References Cited by the Examiner

UNITED STATES PATENTS

| | | | |
|---|---|---|---|
| 732,640 | 6/1903 | Joseph | 106—110 |
| 1,690,708 | 11/1928 | Wiggin et al. | 106—38.3 |
| 1,924,874 | 8/1933 | Moore | 106—110 |
| 2,314,626 | 3/1943 | Neiman | 106—38.3 |

ALEXANDER H. BRODMERKEL, *Primary Examiner.*

L. B. HAYES, *Assistant Examiner.*